Aug. 9, 1938.                O. WITTEL ET AL                2,126,299
CLUTCH CONNECTION FOR MOTION PICTURE APPARATUS OF THE MAGAZINE TYPE
Filed April 24, 1936
*Fig. 1.*
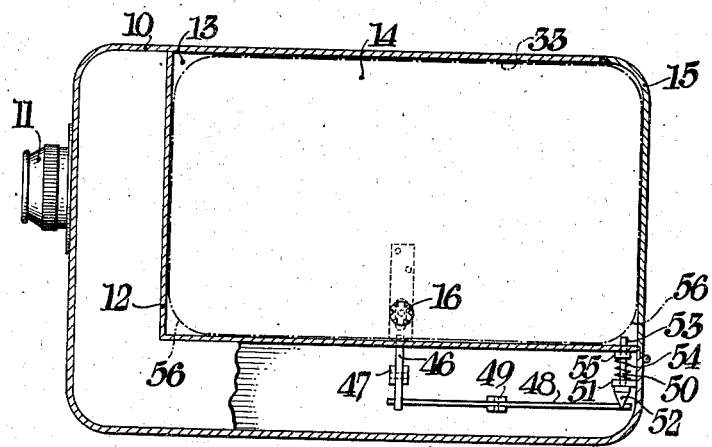
*Fig. 2.*
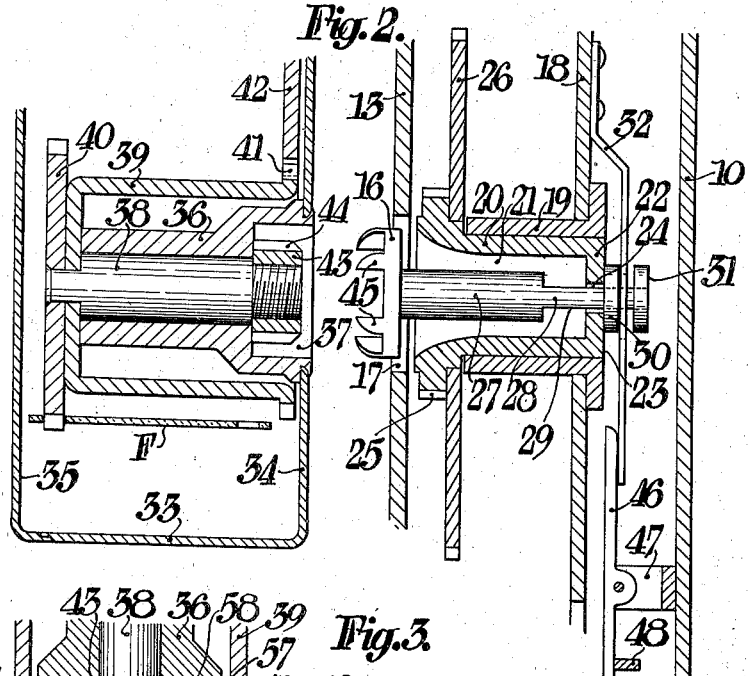
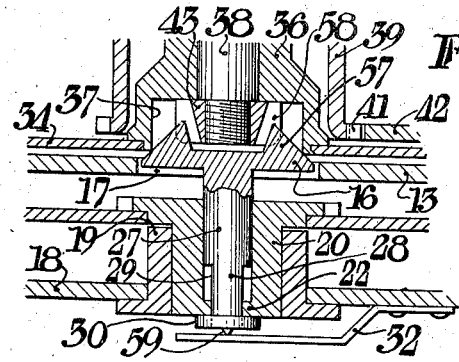
*Fig. 3.*
Otto Wittel, Lawrence R. Martin
and D. Hunter Smiley,
                    INVENTORS:
BY
                    ATTORNEYS.

Patented Aug. 9, 1938

2,126,299

UNITED STATES PATENT OFFICE 2,126,299

CLUTCH CONNECTION FOR MOTION PICTURE APPARATUS OF THE MAGAZINE TYPE

Otto Wittel, Lawrence R. Martin, and Dwight Hunter Smiley, Rochester, N. Y., assignors, by mesne assignments, to Eastman Kodak Company, Jersey City, N. J., a corporation of New Jersey Application April 24, 1936, Serial No. 76,174

6 Claims. (Cl. 88—17)

The present invention relates to an automatic control arrangement for supervising the driving clutch member of a motion picture apparatus of the magazine type and more particularly to the specific support for said driving clutch member.

Since it is preferred to mount the driven clutch within a lateral depression in a magazine casing so that the magazines may be conveniently stacked, it is either necesary to insert the magazine into the apparatus laterally or to retract the driving clutch member for longitudinal endwise insertion of the magazine.

The primary object of the present invention is an automatic control for a driving clutch member which extends into a magazine chamber and which control is supervised by insertion and withdrawal of the magazine itself.

Another object of the present invention is a mounting for the driving clutch member which premits depression of the clutch member or a swivel movement to facilitate engagement with the driven clutch member.

A further object of the invention is the provision of cam surfaces on the clutch members, which cam surfaces will permit the magazine to retract the driving clutch member for ready insertion and removal of the magazine.

Other objects of the invention will be suggested to those skilled in the art by the following disclosure.

The above and other objects of the invention are obtained by providing a motion picture apparatus of the magazine type with a driving clutch member which is normally pressed into the magazine chamber of the apparatus and which may be controlled by a linkage and a spring-pressed pin which pin also extends into the magazine chamber. The magazine casing is either recessed or provided with rounded corners so that the spring-pressed pin is operated by entry of the magazine into the chamber, upon complete insertion of the magazine into the camera, or upon withdrawal of the magazine from said chamber. The driving clutch member is mounted loosely within a cap member and is spring pressed toward the magazine chamber. The engaging members on each clutch member may be provided with cam surfaces so that mere insertion or withdrawal of the magazine will retract the driving clutch member to permit such insertion or withdrawal.

Reference is hereby made to the accompanying drawing wherein like reference characters designate similar elements and wherein:

Fig. 1 is a longitudinal cross-section through a motion picture apparatus of the magazine type and illustrating one form of automatic control for the driving clutch member.

Fig. 2 is a transverse cross section to enlarged scale through the apparatus and through the magazine on the axes of the clutch members therein.

Fig. 3 is a transverse fragmentary cross-section through the clutch members which have engaging means provided with cam surfaces.

By way of example only the invention is disclosed as applied to a motion picture camera of the magazine type. Such camera includes a casing 10 to which an objective 11 is attached and within which edge walls 12 and a side wall 13 form an open ended magazine chamber 14. A door 15 is hinged to casing 10 and encloses the opened end of magazine chamber 14.

The driving clutch member 16 normally extends through an opening 17 in the side wall 13 and into the magazine chamber 14. Said driving clutch member is mounted for a swivel-like movement in the following manner, see Fig. 2. A mechanism plate 18 is mounted within casing 10 and carries a supporting bushing 19. A cap member 20 is journaled in supporting bushing 19, is provided internally with a flared recess 21 and has an end wall 22. Said end wall 22 has a flat end surface 23 and is provided with an opening 24. The opening 24 has at least one flat side for a purpose to be later described. Cap member 20 carries a ring of teeth 25 and a pinion gear 26 for engagement with other gears in the camera, not shown. A stem member 27 has the driving clutch member 16 attached to one end thereof and at the other end includes a restricted portion 28 having a flat 29 and includes a retaining portion 30 which also has a flat side facing the flat surface 23 on end wall 22 of cap member 20. A retaining member 31 is also mounted on the restricted portion 28 of stem member 27 in spaced relation to the retaining portion 30. A resilient means such as a spring member 32 is attached to mechanism plate 18 and bears against the retaining portion 30 of the stem member 27.

The restricted portion 28 fits loosely into the opening 24 in the end of cap member 20 so that the stem member may swivel within the flared recess 21 of said cap member 20. However, the flat 29 on restricted portion 28 co-operates with the flat side of opening 24 so that the stem member will rotate with cap member 20 after engagement of these surfaces. Furthermore, the spring member 32 accomplishes two functions. First, said spring member bears on the retaining portion 30 to move the stem member 27 and the driving clutch member 16 toward the magazine chamber 14. At the same time the flat side of the retaining portion 30 is pressed against the flat surface 23 on end wall 22 so that the stem member 27 tends to be centered within the flared recess 21 of cap member 20.

The film magazine may be of standard design in which the driven clutch member of the magazine is recessed within a lateral depression of the magazine casing. The film magazine may comprise a casing 33 having a side wall 34 and a cover 35. A bushing 36 is attached to side wall 34 and is provided at one end with a lateral depression 37. A shaft 38 is journaled in bushing 36 and is connected at one end to a cap 39 and sprocket disc 40 for engaging the film F. The cap 39 has a toothed skirt 41 for engaging with a pinion gear 42 within the magazine casing 33. A driven clutch member 43 is threaded onto the other end of shaft 38 and is provided with a plurality of teeth 44. The driving clutch member 16 is also provided with teeth 45 which are adapted to inter-engage with the teeth 44 on the driven clutch member 43.

Upon relative axial movement of the magazine and camera toward each other, the teeth 45 on clutch member 16 will inter-engage with the teeth 44 on driven clutch member 43 to form a driving connection. In the event that teeth 45 abut against the end of driven clutch member 43, the spring member 32 permits retraction of the driving clutch member 16 and stem member 27 until such time as the teeth 44 and 45 become inter-engaged whereupon spring 32 moves the clutch member 16 toward the clutch member 43. In the event that clutch members 16 and 43 are not in exact axial alignment, the loose connection between the restricted portion 28 and the opening 24 in cap member 20 will permit clutch member 16 and stem member 27 to swing in the necessary direction to permit inter-engagement of the clutch member. Upon withdrawal of the non-aligning clutch member 43, the spring 32 will press the flat surfaces on the retaining portion 30 and on the end of cap member 20 together again to right the clutch member 16 and stem member 27 within the flared recess 21 of cap member 20.

The automatic control of the driving clutch member 16 may be accomplished in the manner now to be described. A lever 46 is pivoted in a support 47 on the casing 10. A second lever 48 is pivoted in a perpendicular plane in a support 49 on a side wall of casing 10. A pin 50 is slidably mounted in a support 51 on the rear wall of casing 10, has a tapered end 52 for engaging and camming one end of lever 48 and has its rear end 53 extending into the magazine chamber 14 adjacent the door 15. A coil spring 54 encircles pin 50, bears against support 51 at one end and against a washer 55 attached to pin 50 just below the lower edge wall 12 of the magazine chamber 14. The magazine casing 33 is conventionally provided with rounded corners 56.

As the film magazine is inserted longitudinally into the open end of magazine chamber 14, the front rounded corner 56 of the magazine casing 33 will press pin 50 downwardly so that the tapered end 52 thereof will swing the end of lever 48 to the rear. This movement of lever 48 will swing the lower end of lever 46 outwardly and will cause clock-wise movement, see Fig. 2, of the upper end of lever 46. This upper end of lever 46 bears against the end of spring member 32 and moves said spring member against retaining member 31 to retract the stem member 27 and clutch member 16 from the magazine chamber 14. The tapered end 52 of pin 50 and the mechanical advantages of levers 48 and 46 can be readily designed so that the clutch member 16 is retracted within the side wall 13 of the magazine chamber and so that the film magazine can be readily inserted in an endwise longitudinal direction. After the film magazine has been completely inserted the rear rounded corner 56 of magazine casing 33 permits coil spring 54 to move pin 50 upwardly whereupon the spring member 32 will move stem member 27 and clutch member 16 into the magazine chamber and into engagement with the driven clutch member 43 and at the same time will return levers 46 and 48 to their original position. As before if there is any non-registration or non-alignment between clutch members 16 and 43, the spring member 32 will force the clutch members together upon registration or will permit tilting of the stem member 27.

It is also within the contemplation of the present invention to accomplish the automatic retraction of the driving clutch member by means of a proper designing of the engaging means or teeth upon the clutch members. One form of such arrangement of engaging means is shown in Fig. 3.

As in the preferred form of the invention as disclosed in Fig. 2, the driving clutch member 16 is mounted upon one end of a stem member 27 which has a restricted portion 28 with a flat side 29 and which has a retaining portion 30 for fitting against the flat side of the end wall 22 of cap member 20. Said cap member 20 is journaled in supporting bushing 19 which is in turn attached to mechanism plate 18. The driving clutch member 16 extends through an opening 17 in the side wall 13.

The driven clutch member on the film magazine is also quite similar including a magazine side wall 34, a bushing 36 provided with a lateral depression 37 and supporting a shaft 38 which carries a cap 39 in engagement with a pinion gear 42.

This modification of the invention differs, however, in certain respects. First, the engaging members 57 on the driving clutch member 16 are provided on each side with sloping cam surfaces. The stem member 27 makes a sliding fit with the interior of cap member 20 and is always supported in a central position. On the film magazine, the driven clutch member 43 is also provided with engaging members 58 which are inclined toward each other at the bases thereof. As a result upon insertion of the magazine the forward edge of the magazine casing will engage against the cam surface of one of the engaging members 57 on the driving clutch member 16 and will retract that clutch member, which cannot swivel, against the action of the spring member 32. The converging taper at the base of the engaging members 58 will also create a camming action to permit the final location of the film magazine with the clutch members in axial alignment.

Furthermore, upon withdrawal of the film magazine, the edges of the lateral depression 37 will augment the camming action between the inner cam surfaces of engaging member 57 to retract the driving clutch member 16 during removal of the film magazine. Accordingly, these co-operating cam surfaces upon the driving and driven clutch members 16 and 43 will permit endwise longitudinal insertion of a film magazine which is provided with a lateral depression for receiving the driving clutch member in a lateral direction.

Since it is not necessary to withdraw the driving clutch member 16 from its inner end according to this modification, the inner end of the stem member 27 is provided with a pointed projection 59 upon which a spring member 32 bears with minimum friction.

Since many modifications of the present invention are possible, the present disclosure is to be construed in an illustrative sense and the scope of the invention is defined by the claims which follow.

Having now particularly described our invention what we desire to secure by Letters Patent of the United States and what we claim is:

1. In a photographic apparatus of the magazine type, the combination with a housing provided with a magazine chamber having an open end, a driving clutch member in said housing, transversely movable in said chamber and normally extending into said chamber, a magazine casing containing a film supply, provided with a lateral depression, and adapted to be longitudinally inserted endwise into said magazine chamber, and a driven clutch member mounted on said magazine casing and within the lateral depression thereof, of a positive motion transmitting means associated with said driving clutch member and including a surface which is within said magazine chamber and which is adapted during the endwise longitudinal insertion of said magazine casing into said chamber to be engaged and moved by said magazine casing for movement of said driving clutch member to permit the complete insertion of said magazine casing.

2. In a photographic apparatus of the magazine type, the combination with a housing provided with a magazine chamber having an open end, a driving clutch member in said housing, transversely movable in said chamber and normally extending into said chamber, a magazine casing containing a film supply, provided with a lateral depression and adapted to be longitudinally inserted endwise into said magazine chamber, and a driven clutch member mounted on said magazine casing and within the lateral depression thereof, of a linkage operatively connected to said driving clutch member and for moving the same transversely with respect to said magazine chamber, and an operating member for moving said linkage, extending into said magazine chamber and located so as to be engaged and moved by the magazine casing upon endwise longitudinal insertion thereof into said magazine chamber.

3. In a photographic apparatus of the magazine type, the combination with a housing provided with a magazine chamber having an open end, a driving clutch member in said housing, transversely movable into said chamber and normally extending into said chamber, a magazine casing containing a film supply, provided with a lateral depression and adapted to be longitudinally inserted endwise into said magazine chamber, and a driven clutch member mounted on said magazine casing and within the lateral depression thereof, of a linkage operatively connected to said driving clutch member and for moving the same transversely with respect to said magazine chamber, and an operating member for moving said linkage, extending into said magazine chamber and located so as to be engaged and moved by the magazine casing upon endwise longitudinal insertion thereof into said magazine chamber and arranged so as not to be engaged after insertion of the magazine casing into said chamber a distance such that said driven clutch member is in alignment with said driving clutch member which then assumes its normally extended and engaging position.

4. In a photographic apparatus of the magazine type, the combination with a housing provided with a magazine chamber having on open end, a driving clutch member in said housing normally extending into said chamber and transversely movable therein and including engaging means with cam surfaces, a magazine casing containing a film supply, provided with a lateral depression and adapted to be longitudinally inserted endwise into said magazine chamber, and a driven clutch member mounted on said magazine casing and having engaging means with cam surfaces within said lateral depression of said casing, the cam surfaces of the engaging means on said driving clutch member being engaged by the magazine casing upon longitudinal insertion thereof and being transversey depressed by the magazine casing until said driven clutch member is in alignment with said driving clutch member, whereupon the engaging means of the two clutch members become interengaged.

5. In a photographic apparatus of the magazine type, the combination with a housing provided with a magazine chamber having an open end, a driving clutch member in said housing normally extending into said chamber and transversely movable therein and including engaging means with cam surfaces, a magazine casing containing a film supply, provided with a lateral depression and adapted to be longitudinally inserted endwise into said magazine chamber, and a driven clutch member mounted on said magazine casing and having engaging means with cam surfaces within said lateral depression of said casing, the engaging means of the two clutch members being interengaged for a driving connection and the cam surfaces on said clutch member being so arranged as to permit withdrawal of the magazine casing from said chamber with lateral movement of said driving clutch member by said cam surfaces.

6. In a photographic apparatus of the magazine type, a combination with a housing provided with a magazine chamber having an open end, a driving clutch member in said housing normally extending into said chamber and transversely movable therein and including engaging means with cam surfaces, a magazine casing containing a film supply, provided with a lateral depression and adapted to be longitudinally inserted endwise into said magazine chamber, and a driven clutch member mounted on said magazine casing and having engaging means with cam surfaces within said lateral depression of said casing, the engaging means of the two clutch members being interengaged for a driving connection and the cam surfaces on said clutch members being so arranged as to permit withdrawal of the magazine casing from said chamber with lateral movement of said clutch member by said cam surfaces, the margins of the lateral depression in said casing starting the depression of said driving clutch member.

OTTO WITTEL.
LAWRENCE R. MARTIN.
D. HUNTER SMILEY.